(12) United States Patent
Sugano et al.

(10) Patent No.: US 12,730,935 B2
(45) Date of Patent: Sep. 8, 2026

(54) ANONYMIZATION PROCESSING DEVICE AND REMOTE ATTESTATION SYSTEM

(71) Applicant: DENSO CORPORATION, Kariya-city (JP)

(72) Inventors: Yasuharu Sugano, Kariya-city (JP); Takeshi Nakamura, Kariya-city (JP); Tomonori Ikuse, Kariya-city (JP); Madoka Asai, Kariya-city (JP); Carlos Mora-Golding, Southfield, MI (US); Ameer Kashani, Southfield, MI (US)

(73) Assignee: DENSO CORPORATION, Kariya-city (JP)

( * ) Notice: Subject to any disclaimer, the term of this patent is extended or adjusted under 35 U.S.C. 154(b) by 44 days.

(21) Appl. No.: 18/814,876

(22) Filed: Aug. 26, 2024

(65) Prior Publication Data

US 2026/0057107 A1 Feb. 26, 2026

(51) Int. Cl.
*G06F 21/62* (2013.01)

(52) U.S. Cl.
CPC ................................ *G06F 21/6254* (2013.01)

(58) Field of Classification Search
CPC .................................................. G06F 21/6254
See application file for complete search history.

(56) References Cited

U.S. PATENT DOCUMENTS

2015/0089219 A1* 3/2015 Francis ............... G06F 21/6218 713/165
2016/0203336 A1* 7/2016 Nambiar ............. G06F 21/6245 726/26
2018/0012039 A1* 1/2018 Takahashi .............. G16H 10/60
2020/0082087 A1* 3/2020 Simmons ............ G06F 21/6245

FOREIGN PATENT DOCUMENTS

EP 3229164 A1 10/2017

OTHER PUBLICATIONS

"Overview and Trends of Privacy-Protected Synthetic Data", Jun. 13, 2023, Japan Research Institute, Limited, Advanced Technology Lab, pp. 1-23 with English translation.

* cited by examiner

*Primary Examiner* — Esther B. Henderson
(74) *Attorney, Agent, or Firm* — Harness, Dickey & Pierce, P.L.C.

(57) ABSTRACT

An anonymization processing device used in a remote attestation system including a prover device and a verifier device is provided. The anonymization processing device includes: a personal information detection unit configured to detect whether evidence data output from the prover device contains personal information; an anonymization processing unit configured to perform anonymization processing on the personal information when the personal information is included in the evidence data; and an evidence data transmission unit configured to transmit the anonymized evidence data to the verifier device.

2 Claims, 18 Drawing Sheets

FIG. 2

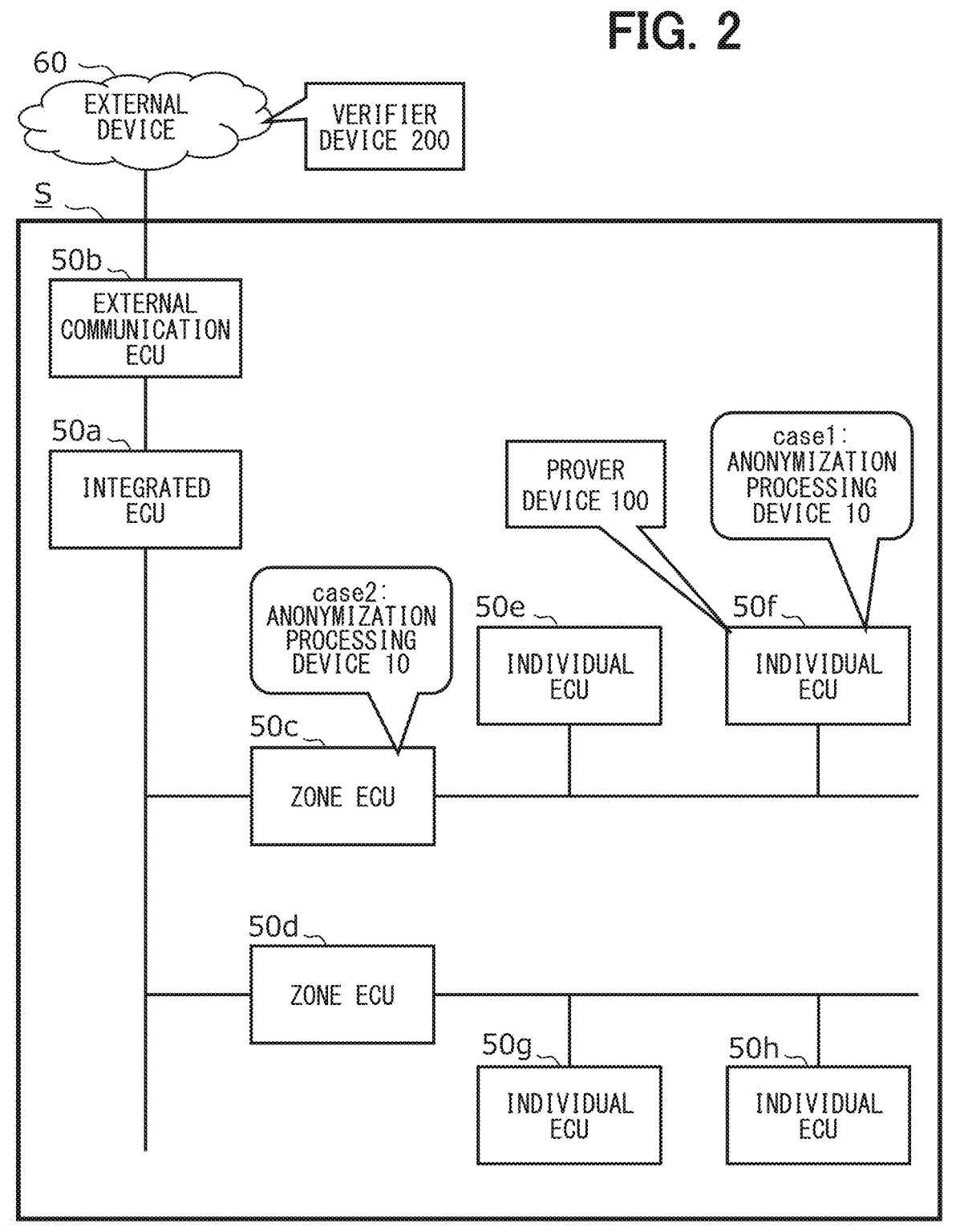

60
EXTERNAL DEVICE
VERIFIER DEVICE 200
S
50b
EXTERNAL COMMUNICATION ECU
50a
INTEGRATED ECU
PROVER DEVICE 100
case1: ANONYMIZATION PROCESSING DEVICE 10
case2: ANONYMIZATION PROCESSING DEVICE 10
50e
INDIVIDUAL ECU
50f
INDIVIDUAL ECU
50c
ZONE ECU
50d
ZONE ECU
50g
INDIVIDUAL ECU
50h
INDIVIDUAL ECU

FIG. 4A

MEASUREMENT INSTRUCTION

- NONCE
- data 1 (134283264, 4096)
- data 3 (134291456, 4096)
- data 2 (134287360, 4096)

FIG. 7A

| Contents ID | VIN | ECU ID | Software /Data ID | Name | Address | Size | Data Type | RAW data |
|---|---|---|---|---|---|---|---|---|
| 1 | XXX | TCU0 | AAA | network-mgr | 0x8010000 | 0x1000 | code | 7f454c4602010100 … |
| 2 | XXX | TCU0 | AAA | network-mgr | 0x8011000 | 0x1000 | Data | 234561208003800 … |
| 3 | YYY | TCU0 | BBB | | | | | 6f4ab38005ce5d31 … |
| … | | | | | | | | |

FIG. 7B

| Contents ID | Context ID | Offset | Size | Type |
| --- | --- | --- | --- | --- |
| 2 | 1 | 0 | 4 | Pointer |
| 2 | 2 | 4 | 32 | Constant string |
| ... | | | | |

FIG. 8

| Request ID(1) | Timestamp | Contents ID | Nonce | data 1 | data 3 | data 2 |
|---|---|---|---|---|---|---|
| 1 | 2021-05-08 10:05:00 UTC | 1 | be38ef7c … | 134283264, 4096 | 134291456, 4096 | 134287360, 4096 |
| 2 | 2021-05-08 13:05:00 UTC | 1 | 894f4f83 … | | | |
| ... | | | | | | |

FIG. 9

| Result ID(1) | Request ID(1) | Timestamp | HASH VALUE |
| --- | --- | --- | --- |
| 1 | 1 | 2021-05-08 10:05:30 UTC | h1, h2, h3 |
| 2 | 2 | 2021-05-08 13:05:30 UTC | |
| ... | ... | | |

FIG. 10

| Request ID (2) | Timestamp | Result ID(1) | Name | Address | Size |
|---|---|---|---|---|---|
| 1 | 2021-05-08 10:15:00 UTC | 1 | network-mgr | 0x08011000 | 0x1000 |
| 2 | 2021-05-08 10:15:30 UTC | 1 | network-mgr | 0x08275000 | 0x2000 |
| ... | | | | | |

FIG. 11

| Result ID (2) | Timestamp | Request ID (2) | RAW data |
|---|---|---|---|
| 1 | 2021-05-08 10:15:05 UTC | 1 | ff00502708 ··· |
| 2 | 2021-05-08 10:15:35 UTC | 2 | 558bec83c4f8 ··· |
| ··· | | | |

ANONYMIZATION PROCESSING DEVICE AND REMOTE ATTESTATION SYSTEM

TECHNICAL FIELD

The present disclosure relates to an anonymization processing device for use in a remote attestation system in which the integrity of software executed on a prover device is verified by a verifier device, and in which evidence data is sent from the prover device to the verifier device. As an example, the present disclosure relates to a remote attestation system in which all or some of devices including the system are mounted in a vehicle.

BACKGROUND

A related are discloses a remote attestation method for verifying the integrity of running processes and systems. In the related art, the prover obtains the starting address, size, and measurement results of the memory region of the process or system and sends them to the verifier. The verifier verifies the integrity of the prover by comparing the correct answer calculated based on the previously prepared or received information with the received measurement results.

SUMMARY

An anonymization processing device used in a remote attestation system including a prover device and a verifier device is provided. The prover device transmits a measurement result in response to a measurement instruction from the verifier device and, based on the measurement result, the verifier device transmits an evidence collection instruction to the prover device to request evidence data, and the prover device transmits the evidence data to the verifier device. The anonymization processing device includes: a personal information detection unit configured to detect whether the evidence data output from the prover device contains personal information; an anonymization processing unit configured to perform anonymization processing on the personal information when the personal information is included in the evidence data; and an evidence data transmission unit configured to transmit the anonymized evidence data to the verifier device.

BRIEF DESCRIPTION OF THE DRAWINGS

Objects, features and advantages of the present disclosure will become more apparent from the following detailed description made with reference to the accompanying drawings. In the drawings:

FIG. 2 is a diagram explaining the arrangement of the prover device, the verifier device, and an anonymization processing device in a vehicle;

FIG. 4A is a diagram illustrating a measurement instruction received by the measurement instruction reception unit;

FIG. 7A and FIG. 7B are diagrams illustrating information stored in advance in a storage unit of the verifier device;

FIG. 8 is a diagram illustrating the measurement instruction transmitted from the verifier device to the prover device;

FIG. 9 is a diagram illustrating measurement results sent from the prover device to the verifier device;

FIG. 10 is a diagram illustrating the evidence request instructions transmitted from the verifier device to the prover device;

FIG. 11 is a diagram illustrating evidence data sent from the prover device to the verifier device;

DETAILED DESCRIPTION

Figure 1A:
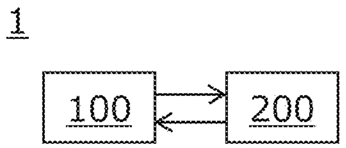
FIG. 1A to FIG. 1C are explanatory diagrams illustrating an arrangement of a prover device, a verifier device, and a remote attestation system.

In recent years, various electronic control devices connected through in-vehicle networks are mounted in automobiles, and software is executed in each electronic control device. However, there is a possibility that such software may be tampered by a cyberattack or the like due to being compromised, causing the software to operate differently from the expected behavior. To address these issues, the use of remote attestation is being considered. The remote attestation is a mechanism that can confirm the integrity of a device or software on the device during remote operation or the like for the purpose of device management and operation.

The inventors of the present disclosure have found the following difficulties as a result of detailed study. After the remote attestation disclosed in the related art, there may be a case where raw data in a memory region is collected as evidence data for the purpose of forensics, such as investigation and analysis. However, when the raw data contains personal information of the user of the vehicle, the collection of the raw data may result in the leakage of the personal information.

The present disclosure provides a technique to achieve an anonymization processing device and a remote attestation system that can prevent the leakage of the personal information even when the personal information is included in the evidence data transmitted from a prover device to a verifier device.

According to one aspect of the present disclosure, an anonymization processing device used in a remote attestation system including a prover device and a verifier device is provided. The prover device transmits a measurement result in response to a measurement instruction from the verifier device, and, based on the measurement result, the verifier device transmits an evidence collection instruction to the prover device to request evidence data, and the prover device transmits the evidence data to the verifier device. The anonymization processing device includes: a personal information detection unit configured to detect whether the evidence data output from the prover device contains personal information; an anonymization processing unit configured to perform anonymization processing on the personal information when the personal information is included in the evidence data; and an evidence data transmission unit configured to transmit the anonymized evidence data to the verifier device.

According to the above configuration, the anonymization processing device and a remote attestation system performs the anonymization processing on the personal information contained in evidence data, thereby preventing the leakage of personal information.

Hereinafter, embodiments of the present disclosure will be described with reference to the drawings.

When there are multiple embodiments (including modifications), the configurations disclosed in the embodiments are not limited to the embodiments, and can be combined across the embodiments. For example, the configuration disclosed in one embodiment may be combined with another embodiment. The disclosed configurations in respective embodiments may be partially combined with one another.

(Premise of Each Embodiment)

(1) Arrangement of a Prover Device 100, a Verifier Device 200, and a Remote Attestation System 1

Figure 1B:
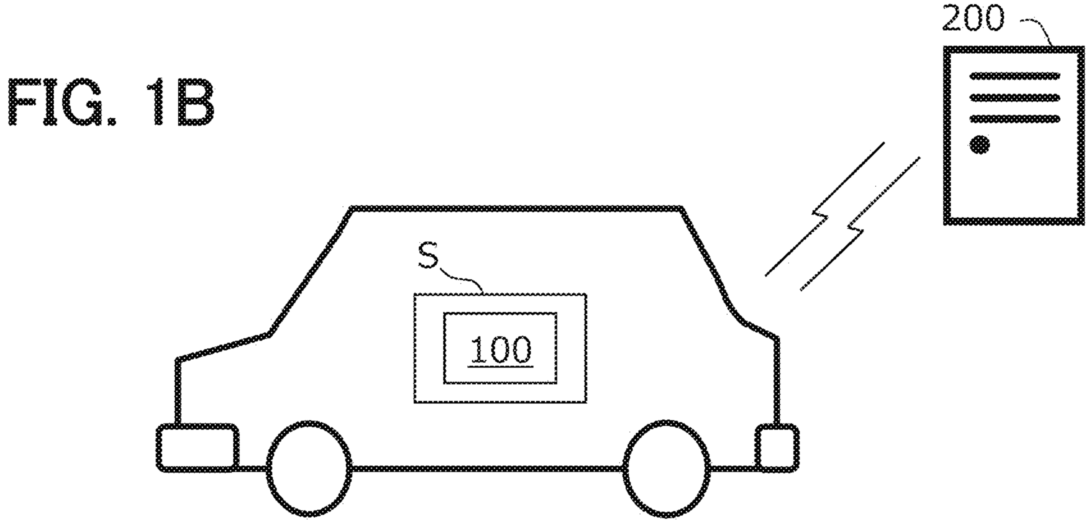
Figure 1C:
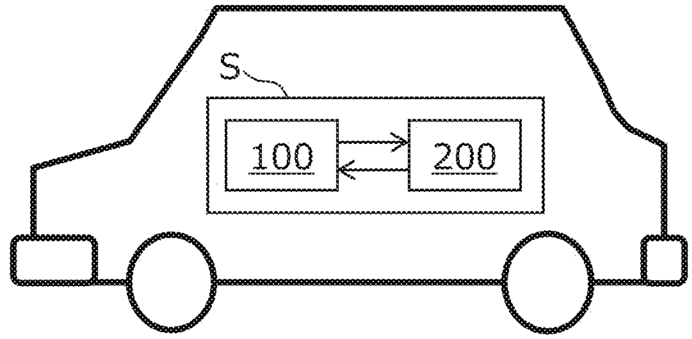

FIG. 1A to FIG. 1C are diagrams illustrating the arrangement of a prover device 100, a verifier device 200, and a remote attestation system 1. An outline of each device and a connection method will be described with reference to FIG. 1A.

The prover device 100 is a device that places “software” in a “memory” and executes the software. The device is a device that is a target for proving the integrity of the software executed, that is, a device that provides evidence information for proving its own integrity. Therefore, the device is referred to as a prover device.

The verifier device 200 is a device that verifies the integrity of “software” executed by the prover device 100, that is, a device that verifies the integrity of the prover device based on the evidence information received from the prover device. Therefore, the device is referred to as a verifier device.

The prover device 100 and the verifier device 200 are collectively referred to as the remote attestation system 1.

Here, the “software” includes not only a case where the software is made up of program code and data but also a case where the software is made up of only program code or only data.

For the “memory”, a position-identifiable readable/writable storage medium is sufficient, which may include non-volatile memory such as a flash memory or a hard disk, in addition to volatile memory such as a random access memory.

The prover device 100 and the verifier device 200 are connected using a wired or wireless communication method to send and receive measurement instructions, measurement results, evidence collection instructions, etc., as explained later.

Examples of wired communication methods include the Internet, fixed telephone lines, and Ethernet (registered trademark). When an in-vehicle network is used, a controller area network (CAN) or a local interconnect network (LIN) can be used.

Examples of the wireless communication method include, for example, IEEE802.11 (Wi-Fi: registered trademark), IEEE802.16 (WiMAX: registered trademark), W-CDMA (Wideband Code Division Multiple Access), HSPA (High Speed Packet Access), LTE (Long Term Evolution), LTE-A (Long Term Evolution Advanced), 4G, 5G, and the like. Other options include Dedicated Short Range Communication (DSRC), Bluetooth Low Energy (BLE), or Bluetooth (registered trademark).

As to which communication method may be used, the most appropriate communication method may be adopted depending on the location and distance where the prover device 100 and the verifier device 200 are installed.

The communication between the prover device 100 and the verifier device 200 may be protected by a secure communication protocol such as mTLS.

The placement positions of the prover device 100 and the verifier device 200 are arbitrary. That is, the positions of the prover device 100 and the verifier device 200 and the distance between the prover device 100 and the verifier device 200 are arbitrary.

For example, as illustrated in FIG. 1B, the prover device 100 may be mounted in a vehicle, and the verifier device 200 may be provided outside the vehicle. For example, the prover device 100 may be an “electronic control device” (electric control unit, ECU) “mounted” in a vehicle that is a “mobile object”, and the verifier device 200 may be a server device installed outside the vehicle that is the “mobile object”. That is, the prover device 100 is located inside an electronic control system S, and the verifier device 200 is located outside the electronic control system S. The electronic control device is a device constituting the electronic control system of the vehicle. In this case, the prover device 100 and the verifier device 200 are connected via Wi-Fi or 5G, for example.

Alternatively, as illustrated in FIG. 1C, both the prover device 100 and the verifier device 200 may be mounted in the vehicle. For example, the prover device 100 may be an “electronic control device” which is “mounted” in the vehicle that is the “mobile object”, and the verifier device 200 may be another “electronic control device” which is “mounted” in the vehicle that is the “mobile object”. That is, both the prover device 100 and the verifier device 200 are located inside the electronic control system S. In this case, the prover device 100 and the verifier device 200 are connected by Ethernet or CAN.

In addition, both the prover device 100 and the verifier device 200 may be provided outside the vehicle, regardless of which vehicle.

Herein, the “mobile object” refers to a movable object, and a movement speed may be arbitrary. A case where the mobile object is stopped is also included. Examples of the mobile object include, but are not limited to, an automobile, a motorcycle, a bicycle, a pedestrian, a ship, an aircraft, and an object mounted thereon.

The term “mounted” includes not only a case where an object is directly fixed to the mobile object but also a case where an object is moved together with the mobile object although the object is not fixed to the mobile object. Examples of the object include an object carried by a user who is in the mobile object and an object attached to a load carried by the mobile object.

The “electronic control device” may be a virtualized electronic control device implemented using virtualization technology, in addition to a physically independent electronic control device.

In each of the following embodiments, the arrangement in FIG. 1B is assumed.

(2) Arrangement of the Prover Device 100, the Verifier Device 200, and the Anonymization Processing Device 10 in a Vehicle FIG. 2 illustrates an example of an electronic control system S installed in a vehicle and the arrangement of the prover device 100 and the anonymization processing device 10 in the electronic control system S.

The electronic control system S includes the plurality of ECUs 50 and an in-vehicle network connecting the ECUs 50. Although FIG. 2 illustrates eight ECUs (ECUs 50*a* to 50*h*), the electronic control system S may include any number of ECUs. In the following description, the ECU 50 and the ECUs 50 are described comprehensively for a single or multiple electronic control units, and the ECU 50*a*, ECU 50*b*, ECU 50*c*, . . . are described when individual electronic control units are specifically described.

In the case of FIG. 2, the ECUs 50 are connected to one another via an in-vehicle communication network such as controller area network (CAN) and local interconnect network (LIN). Alternatively, the ECUs 50 may be connected via any communication method, whether wired or wireless, such as Ethernet (registered trademark), Wi-Fi (registered trademark), or Bluetooth (registered trademark).

The connection refers to a state in which data can be exchanged and includes a case in which different pieces of hardware are connected via a wired or wireless communication network and a case in which virtual ECUs (alternatively, referred to as virtual machines) implemented on the same piece of hardware are virtually connected.

The electronic control system S illustrated in FIG. 2 includes an integrated ECU 50*a*, an external communication ECU 50*b*, zone ECUs 50*c*, 50*d*, and individual ECUs 50*e*, 50*f*, 50*g*, 50*h*.

The integrated ECU 50*a* is an ECU having a function of controlling the entire electronic control system S and a gateway function of mediating communication among the ECUs 50. The integrated ECU 50*a* may be referred to as a gateway ECU (G-ECU) or a mobility computer (MC). The integrated ECU 50*a* may be a relay device or a gateway device.

The external communication ECU 50*b* is an ECU including a communication unit that communicates with the external device 60 provided outside the vehicle. A communication method used by the external communication ECU 50*b* is the wireless communication method or the wired communication method described with reference to FIG. 1A to FIG. 1C.

In order to implement a plurality of communication methods, the electronic control system S may include the plurality of external communication ECUs 50*b*. Instead of providing the external communication ECU 50*b*, the integrated ECU 50*a* may have a function of the external communication ECU 50*b*.

Each zone ECU 50*c*, 50*d* has a gateway function provided according to a function or a location where each individual ECU 50*e* to 50*h* is arranged. For example, the zone ECU 50*c* has a gateway function of relaying communication between the individual ECU 50*e*, 50*f* disposed in the front of the vehicle, and another ECU 50. The zone ECU 50*d* has a gateway function of relaying communication between the individual ECU 50*g*, 50*h* disposed in the rear of the vehicle, and another ECU 50.

The individual ECUs 50*e*, 50*f*, 50*g*, 50*h* can be implemented by ECUs having any function. Examples of individual ECUs include a drive system electronic control unit that controls an engine, a steering wheel, a brake, and the like, a vehicle body system electronic control unit that controls a meter, a power window, and the like, an information system electronic control unit such as a navigation device, and a safety control system electronic control unit that performs control for preventing a collision with an obstacle or a pedestrian. The ECUs 50 may be classified into a master and a slave instead of parallel arrangement.

Each of the 50 ECUs stores software for their respective functions and reads it into a memory and executes it as needed. Therefore, each ECU 50 can be a prover device 100.

In FIG. 2, the case in which the individual ECU 50*f* is the prover device 100 is used as an example. Suppose that the individual ECU 50*f* is an ECU that, for example, acquires images from a camera installed in the front of the vehicle and determines whether there are any obstacles. And suppose that the individual ECU 50*f* has software loaded into a memory and running that makes such a determination.

When the verifier device 200 is installed outside the vehicle, as in FIG. 1B, the external device 60 in FIG. 2 becomes the verifier device 200. When the verifier device 200 is installed in the vehicle, as shown in FIG. 1C, for example, the integrated ECU 50*a* can be the verifier device 200.

The anonymization processing device 10 described in each embodiment is a device that performs anonymization processing on personal information contained in evidence data when the evidence data generated by the prover device 100 is sent to the verifier device 200. Therefore, the anonymization processing device 10 may be located inside the prover device 100, or it may be located as a separate device from the prover device 100. Even if it is installed as a separate device, it may be installed in close proximity to the prover device 100.

In the following, to avoid redundancy in explanation, to anonymize the personal information contained in the evidence data may be described as performing anonymization processing on the evidence data.

For example, in FIG. 2, the anonymization processing device 10 may be installed in the individual ECU 50*f* as in the case 1. In other words, the anonymization processing device 10 (corresponding to a first electronic control device) and the prover device 100 (corresponding to a second electronic control device) are the same ECU. This arrangement allows the evidence data generated by the prover device 100 to be promptly anonymized within the same device, so that evidence data that has not been anonymized does not flow within the in-vehicle network.

In this state, it may be interpreted that the prover device 100 and the anonymization processing device 10 are different devices on the basis that the processes of the prover device 100 and the anonymization processing device 10 are distinguishable, or on the basis that the prover device 100 and the anonymization processing device 10 are co-located in the same individual ECU 50*f*, the anonymization processing device 10 may be interpreted as being included in the prover device 100, i.e., the anonymization processing device 10 is part of the prover device 100.

For example, in FIG. 2, the anonymization processing device 10 may be installed in the individual ECU 50*c* as in the case 2. In other words, the anonymization processing device 10 (corresponding to a first electronic control unit) and the prover device 100 (corresponding to a second electronic control unit) are the different ECUs. This arrangement reduces the resources required for the anonymization process, as only at least one ECU in the vehicle is needed to perform the anonymization process. By installing the anonymization processing device 10, for example, in an integrated ECU 50_a_ or zone ECUs 50_c_, 50_d_ where information from individual ECUs 50_e_-50_h_ is easily gathered, anonymization processing can be performed on evidence data without increasing traffic.

In both cases 1 and 2 of FIG. 2, the anonymization processing device 10 of each embodiment is an "electronic control unit" (ECU) "mounted" on a vehicle, which is a "moving vehicle".

In each embodiment, the prover device 100, the verifier device 200, and the anonymization processing device 10 are collectively referred to as the remote attestation system 1.

2. First Embodiment

(1) Configuration of the Prover Device 100

A configuration example of the prover device 100 according to the present embodiment will be described with reference to FIG. 3. The prover device 100 has a software storage unit 101, a memory 102, a measurement instruction reception unit 103, a measurement unit 104, a measurement result transmission unit 105, an evidence collection instruction reception unit 106, and an evidence data collection unit 107.

The prover device 100 may include a general-purpose central processing unit (CPU), a volatile memory such as RAM, a non-volatile memory such as ROM, a flash memory, or a hard disk, various interfaces, and an internal bus connecting the elements to each other. By executing software on the hardware, a device can be configured to perform the functions of each functional block described in FIG. 3. The same applies to the anonymization processing device 10 and the verifier device 200 described below.

The prover device 100 places software in a memory and executes it by reading the software stored in the software storage unit 101 into the memory 102. The location of the software in the memory may be the same at all times or may be different for each readout. If it is different for each readout, the placement location should be shared with the verifier device 200. The placement position can be indicated, for example, by a start address indicating the beginning position of the software and the size of the software, if the memory 102 is RAM (Random Access Memory). The size of the software may be omitted when the size of the software is known in the verifier device 200. Alternatively, the placement position may be a start address indicating the leading position and an end address indicating the trailing position.

The measurement instruction reception unit 103 receives a measurement instruction generated by the verifier device 200 from the verifier device 200. In the present embodiment, the measurement instruction includes "measurement region information" indicating a region to be measured in the software. The measurement region information can be any information that can identify all or part of the software in memory, for example, address or size.

Figure 4A:
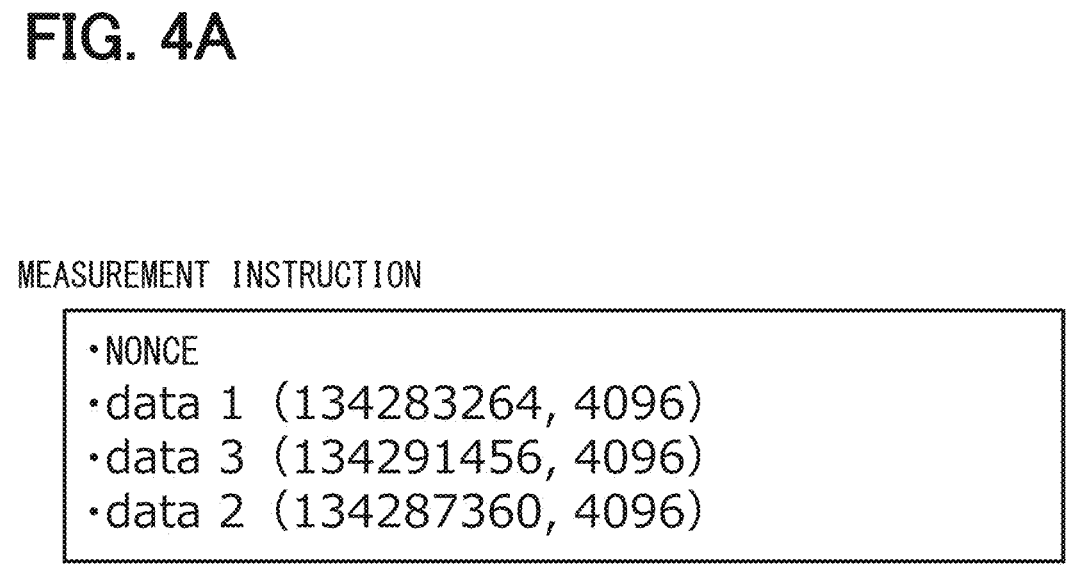
Figure 4B:
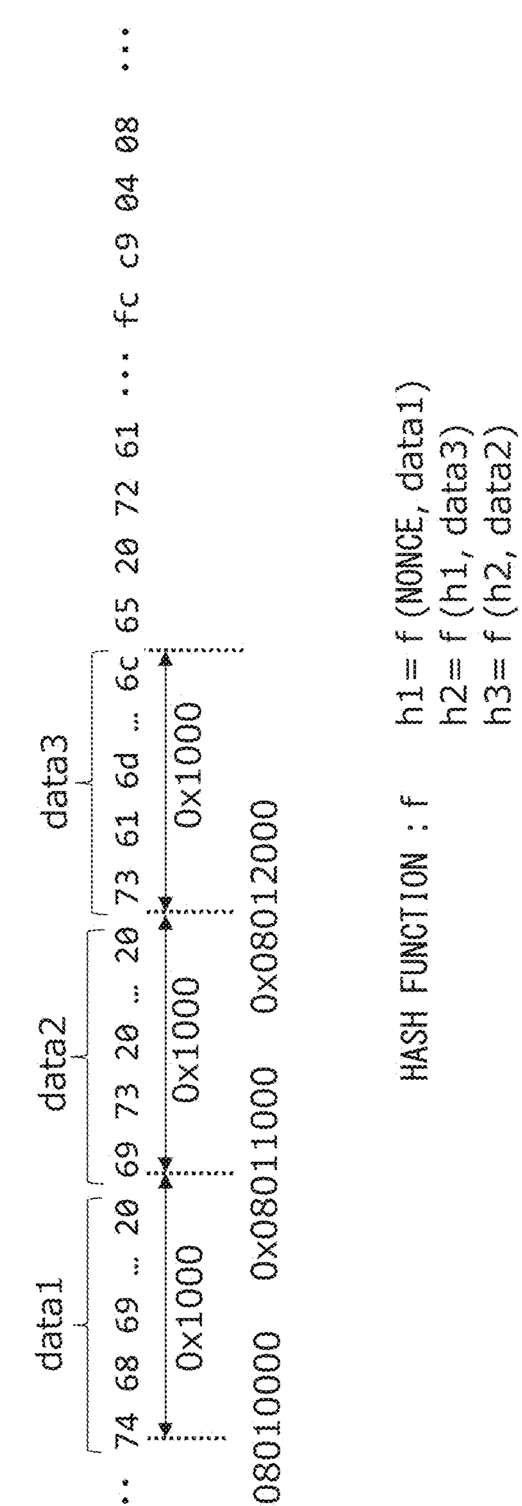
FIG. 4B is a diagram illustrating a processing detail by the measurement unit.

With reference to FIG. 4A and FIG. 4B, specific examples of measurement instructions received by the measurement instruction reception unit 103. In the case of FIG. 4A, the received measurement instruction includes three regions as measurement region information in addition to a nonce. The first region is indicated by the data 1, with a start address of 134283264 (decimal notation), and a size of 4096 bytes. The second region is indicated by the data 3, with a start address of 134291456 (decimal notation), and a size of 4096 bytes. The second region is indicated by the data 2, with a start address of 134287360 (decimal notation), and a size of 4096 bytes.

This measurement instruction also includes an instruction to execute measurement in the order of data1, data3, and data2. That is, the order of data1, data3, and data2 corresponds to the measurement order information.

The nonce is, for example, a random number generated by the verifier device 200, but may also be any numerical value with low predictability, even if not completely random.

The measurement unit 104 reads the software placed in the memory 102 and calculates a measurement value based on the measurement instruction received by the measurement instruction reception unit 103. In this form, a "hash value" is calculated as the measurement value.

Here, the "hash value" is an output value itself calculated by a function that calculates a unique value for an input value, or a value obtained by performing processing such as encryption on the output value, and an algorithm used for the function is arbitrary. For example, the "hash values" include not only a value calculated by a one-way hash function such as SHA512 but also a value calculated by a cipher-based MAC (CMAC), a value calculated by a hash-based MAC (HMAC), and a signature.

In FIG. 4B, the data 1 of the software placed in the memory 102 has a start address of 0x08010000 (hexadecimal notation) and a size of 0x1000 (hexadecimal notation), the data 3 has a start address of 0x08012000 (hexadecimal notation) and a size of 0x1000 (hexadecimal notation), and the data 2 has a start address of 0x08011000 (hexadecimal notation) and a size of 0x1000 (hexadecimal notation). Therefore, based on the respective arguments, the measurement unit 104 reads the corresponding ranges of the software and calculates the respective hash values as follows:

$$h1 = f(\text{nonce, data1});$$

$$h2 = f(h1, \text{data3}); \text{ and}$$

$$h3 = f(h2, \text{data2});$$

$$(f \text{ is a hash function}).$$

The start address may be included as the argument of the hash function.

In FIG. 4B, the hash values are calculated by dividing the data into three regions based on the measurement region information and measurement order information included in the measurement instructions. However, if the measurement instruction does not include instruction to divide the data into regions, the hash values may be calculated using the nonce and the raw data of the software in the memory 102.

The measurement result transmission unit 105 transmits the hash value calculated and obtained by the measurement unit 104 to the verifier device 200 as the measurement result. In the case of FIG. 4B, the measurement result transmission unit 105 transmits the hash values h1, h2, and h3.

In addition to the hash value, a time when the hash value was obtained and error information indicating the address and size of the region to be measured for which measurement has failed may also be transmitted.

The evidence collection instruction reception unit 106 receives evidence collection instruction generated by the verifier device 200 based on the measurement result transmitted from the measurement result transmission unit 105. For example, if the verifier device 200 detects tampering with the software being executed in the memory 102 of the prover device 100, the verifier device 200 generates the evidence collection instruction requesting the transmission of the running software as the evidence data and transmits it to the prover device 100. The evidence collection instruction reception unit 106 receives the evidence collection instruction.

The evidence data collection unit 107 collects the evidence data based on the evidence collection instruction received by the evidence collection instruction reception unit 106. For example, the evidence data collection unit 107 collects the running software by reading it from the memory 102.

The evidence data collection unit 107 then outputs the collected evidence data to the anonymization processing device 10. When the anonymization processing device 10 is the same ECU as the prover device 100, as in the case 1 in FIG. 2, the evidence data is output to the internal bus of the individual ECU 50*f*, i.e., the prover device 100, and the process of the anonymization processing device 10 receives it. By contrast, when the anonymization processing device 10 is a different ECU from the prover device 100, as in the case 2 in FIG. 2, the individual ECU 50*f*, that is, the prover device 100, outputs evidence data to an in-vehicle network such as CAN, and the zone ECU 50*c*, that is, the anonymization processing device 10, receives it.

(2) Configuration of the Anonymization Processing Device 10

The anonymization processing device 10 is a device used when the prover device 100 "transmits" evidence data to the verifier device 200, as described above.

The "case of transmission" is defined as any case where the verifier device is the final destination and includes cases where the prover device transmits directly to the verifier device as well as cases where the prover device transmits indirectly, i.e., through one or more third-party devices.

Figure 3:
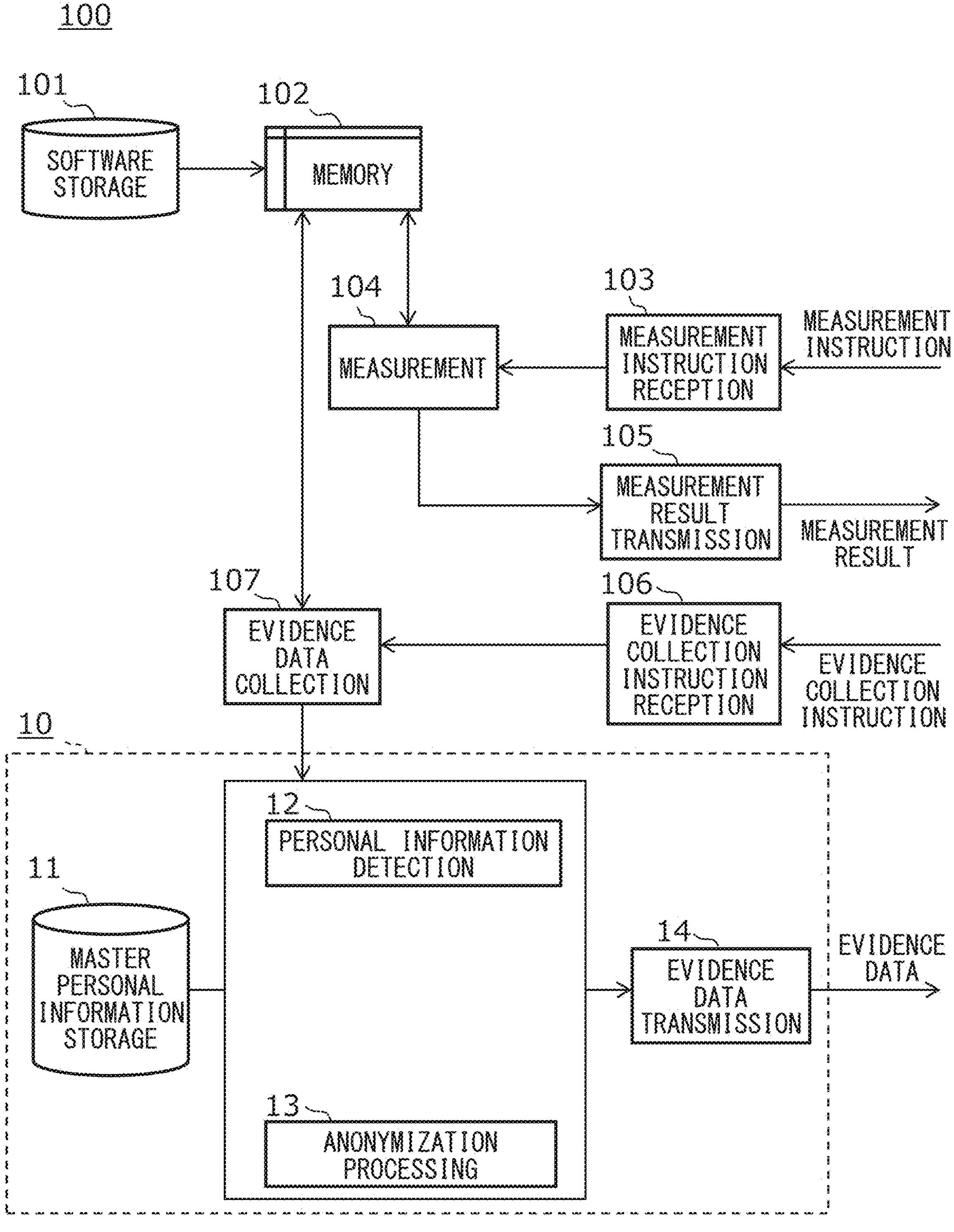
FIG. 3 is a block diagram illustrating a configuration example of the prover device and the anonymization processing device according to the first embodiment.

As with the prover device 100, FIG. 3 is used to illustrate an example configuration of the anonymization processing device 10 in the present embodiment. The anonymization processing device 10 includes a master personal information storage unit 11, a personal information detection unit 12, an anonymization processing unit 13, and an evidence data transmission unit 14.

As previously explained, the anonymization processing device 10 may be installed on the same ECU as the prover device 100 or on a different ECU from the prover device 200.

The master personal information storage unit 11 stores specific personal information included in the software executed by the prover device 100. For example, it stores the name, a phone number, address, etc., of the user of the vehicle in which the prover device 100 is installed. The data format may be text data or binary data, for instance. The master personal information storage unit 11 may be an external storage device (such as a hard disk, USB memory, CD/BD, etc.) or an internal storage device (such as RAM). It may also be volatile or non-volatile.

In this embodiment, the master personal information storage unit 11 is provided inside the anonymization processing device 10, but it may also be located elsewhere. For example, it may be located on a server outside the vehicle. In this case, however, the personal information of a large number of users is managed collectively, rather than only the personal information about the user of a particular vehicle.

The personal information detection unit 12 detects whether the evidence data "output" from the prover device 100 contains "personal information." For example, when the evidence data is software, the personal information stored in the master personal information storage unit 11 is read, and whether or not the read personal information is included in the software source code or data output from the prover device 100 is detected. When the master personal information storage unit 11 is a server located outside the vehicle, the personal information is received by sending a request to the server for personal information associated with the vehicle or user along with information identifying the vehicle or user.

The scope of personal information may be set arbitrarily.

The term "output" includes the case where output is made outside the prover device as well as the case where output is made inside the prover device.

The term "personal information" refers to information that can identify a specific individual on its own, as well as information that can identify a specific individual when combined with other information, which may also be included within the scope of personal information, the privacy information may also be included in the scope of personal information. The scope of personal information may include, for example, an individual's address, name, gender, date of birth, phone number, educational background, work history, as well as photos that can identify the individual, recordings, photos that can identify the individual's residence or surrounding information, personal diaries, and information about private life.

When the personal information detection unit 12 detects the personal information, that is, when "personal information is included" in the evidence data, the anonymization processing unit 13 performs "anonymization processing" on the personal information included in the evidence data.

Here, the term "when the personal information is included" refers to a case where a part of the evidence data includes personal information, but it may also include a case where the entire evidence data is personal information.

The term "anonymization processing" refers to processing that makes it impossible to identify the content of the personal information, such as deletion, encryption, and overwriting (including replacement).

The specific processing content of the anonymization processing unit 13 will be explained with reference to FIG. 5A to FIG. 5C.

Figure 5A:
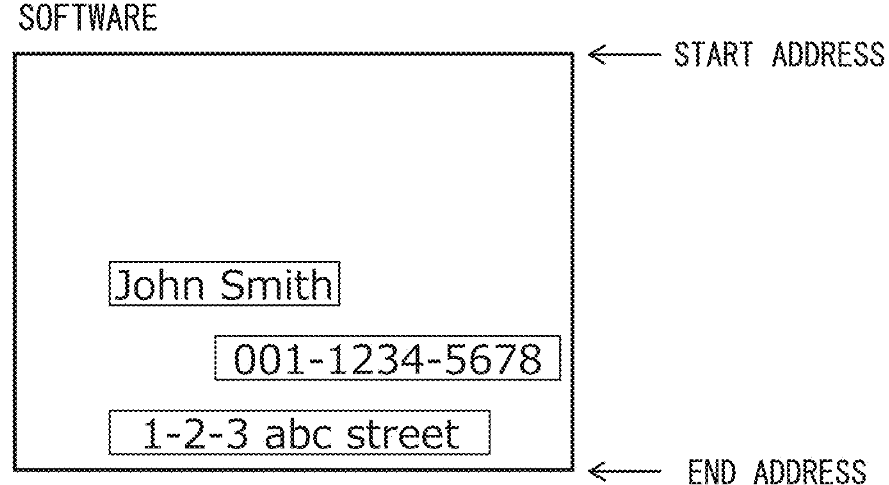
FIG. 5A to FIG. 5C are an explanatory diagram illustrating specific processing contents of the anonymization processing unit.
Figure 5B:
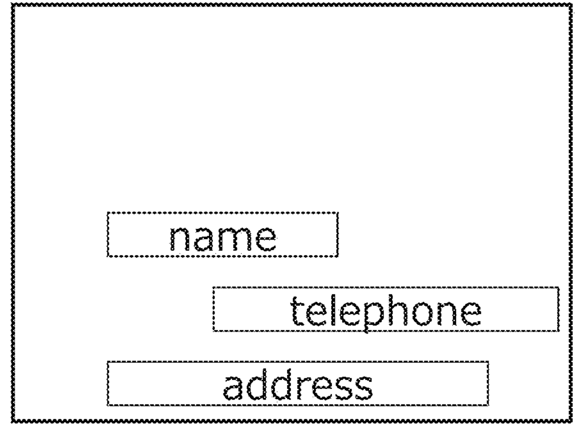
Figure 5C:
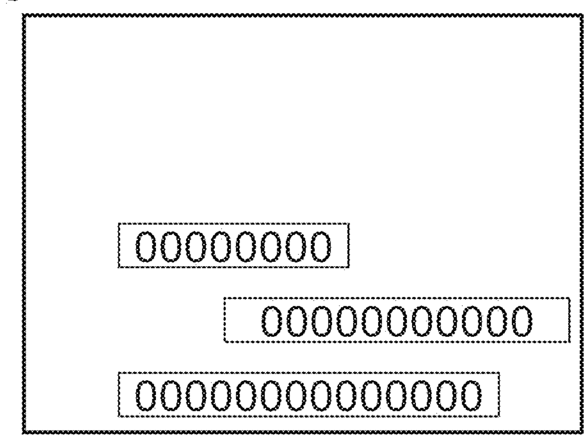

In FIG. 5A to FIG. 5C, assume that the evidence data is software. As shown in FIG. 5A, the personal information detection unit 12 detects that the data including the software includes the name, phone number, and address of the vehicle user. In this embodiment, as shown in FIG. 5B, the anonymization processing unit 13 overwrites the specific personal information included with information indicating the "type of personal information." For example, the specific name part is overwritten with [Name], the specific phone number part is overwritten with [Phone], and the specific address part is overwritten with [Address].

Here, the term "type of personal information" may refer to information indicating the content of the personal information, as well as information indicating the characteristics of the personal information itself. For example, it may be the size of the personal information, the address of the memory where the personal information is stored, or the data format of the personal information.

Alternatively, [Name], [Phone], and [Address] may be encoded as AAA, BBB, and CCC, respectively, and the specific personal information parts may be overwritten with the corresponding codes. Furthermore, the prover device 100 and the verifier device 200 may share a table that stores the correspondence between each type of personal information and its code.

As another example of anonymization processing, as shown in FIG. 5C, the personal information parts may be overwritten with 0 (null) or 1. Alternatively, the personal information parts may be deleted or encrypted with a predetermined key. Additionally, during overwriting, synthetic data may be used. Synthetic data is a general term for data that has the same structure as real data but contains different values.

The method of anonymization processing may be changed according to conditions. For example, the method of anonymization processing may be changed based on the managing entity of the verifier device 200, the type of personal information, or the vehicle model or manufacturer of the verifier device.

The evidence data transmission unit 14 transmits the evidence data, which has been anonymized by the anonymization processing unit 13, to the verifier device 200. For example, the software as shown in FIG. 5B or FIG. 5C is transmitted as the evidence data.

The evidence data transmission unit 14 may transmit, in addition to the anonymized evidence data, at least one of the following: information indicating the "type of personal information" that has been anonymized, the size of the personal information, and the address of the personal information. For example, when transmitting the software that has undergone the anonymization processing shown in FIG. 5C, the following information may be transmitted along with the software:

(a) Information indicating the type of anonymized personal information: [Name], [Phone], [Address]
(b) Size of the personal information: 20 bytes, 6 bytes, 80 bytes
(c) Start address of the personal information: 0x08810000, 0x08930000, 0x13510000

The evidence data transmission unit 14 may choose not to transmit the evidence data when all of the evidence data is personal information.

(3) Configuration of the Verifier Device 200

Figure 6:
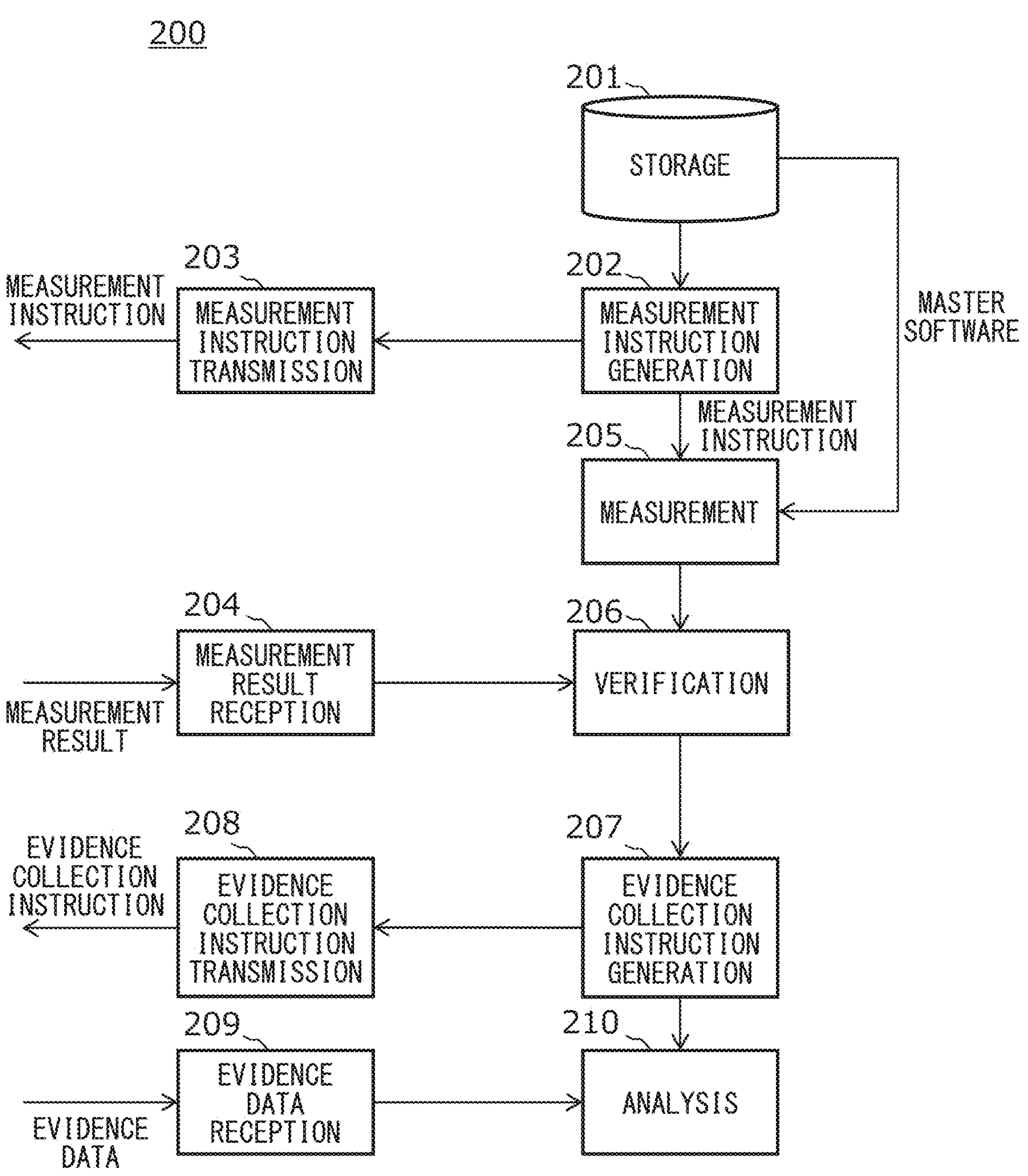
FIG. 6 is a block diagram illustrating an example configuration of the verifier device according to a first embodiment.

The configuration example of the verifier device 200 of the present embodiment will be described with reference to FIG. 6. The verifier device 200 includes a storage unit 201, a measurement instruction generation unit 202, a measurement instruction transmission unit 203, a measurement result reception unit 204, a measurement unit 205, a verification unit 206, an evidence collection instruction generation unit 207, an evidence collection instruction transmission unit 208, an evidence data reception unit 209, and an analysis unit 210.

The storage unit 201 stores information regarding the software that is saved or installed in the prover device 100 in advance. The software is executed in the prover device 100 and is the target of the measurement instruction.

The storage unit 201 may be an external storage device (hard disk, USB memory, CD/BD, etc.) or an internal storage device (RAM, etc.). It may also be volatile or non-volatile.

A specific example of the information stored in the storage unit 201 will be explained with reference to FIG. 7A and FIG. 7B.

The storage unit 201 stores a measurement target table that records information about the software to be measured. As shown in FIG. 7A, the measurement target table includes a content identifier (Contents ID) that specifies the software, a vehicle identifier (VIN) that identifies the vehicle on which the software is installed, an ECU identifier (ECU ID) that identifies the ECU where the software is installed, an identifier (Software/Data ID) that identifies the programs and data included in the software, the name of the software (Name), the start address of the software in memory (Address), the size of the software (Size), the data type of the software (Data Type), and the raw data (RAW data) of the master software itself installed in the prover device 100, all linked together and stored.

The storage unit 201 also stores a context information table that records detailed information about each software to be measured. As shown in FIG. 7B, the context information table stores a content identifier (Contents ID) that specifies the software, a context identifier (Context ID) that specifies the context, which is an element of the software, the storage start position (Offset) in a memory where the context is stored, the size (Size) of the context, and the type (Type) of the context, in an associated manner.

The measurement instruction generation unit 202 generates measurement instructions for the prover device 100. In this embodiment, the measurement instruction generation unit 202 generates the measurement instruction that directs the prover device 100 to calculate a hash value, which are the measurement value of the software executed on the prover device 100.

In this embodiment, the measurement instruction includes "measurement region information" indicating the region of the software to be measured. For example, as shown in the example in FIG. 4A, the measurement instruction includes a nonce and multiple pieces of measurement region information (data 1, data 3, data 2), as well as measurement order information (data 1, data 3, data 2) indicating the order in which the multiple pieces of measurement region information are to be executed.

A specific example of the measurement instruction generated by the measurement instruction generation unit 202 will be explained using FIG. 8. In the example in FIG. 8, the measurement instruction includes an identifier of the measurement instruction (Request ID(1)), a time when the measurement instruction generation unit 202 generated the measurement instruction or when the measurement instruction transmission unit 203 transmitted the measurement instruction (Timestamp), a content identifier that specifies the software executed on the prover device 100 (Contents ID), a nonce (Nonce), and measurement region information (data 1, data 3, data 2). Note that when the hash value calculation is directed for the entire software, the measurement region information is not necessary.

In addition, the measurement instruction may also include a vehicle identifier that identifies the vehicle (VIN), an ECU identifier that identifies the ECU where the software is installed (ECU ID), and an identifier that identifies a program and data included in the executed software (Software/Data ID).

The measurement instruction transmission unit 203 transmits the measurement instruction generated by the measurement instruction generation unit 202 to the prover device 100. The timing for transmitting the measurement instruction may be determined arbitrarily. For example, the measurement instruction may be generated and transmitted periodically at regular intervals, or they may be generated and transmitted when an abnormality occurs. Examples of abnormal occurrences include when the vehicle SOC (Security Operation Center) determines an abnormality due to a cyberattack, or when the PSIRT (Product Security Incident Response Team) determines that integrity verification is necessary. This example may be suited for a case where the verifier device 200 is located outside of the vehicle. Additionally, examples include when a security sensor such as a host-based IDS (Host-based Intrusion Detection System) or a network-based IDS (Network-based Intrusion Detection System) provided in the electronic control system S of FIG. 2 detects an abnormality, or when the in-vehicle SIEM has finished selecting abnormalities to be scrutinized. This example may be suited for a case where the verifier device 200 is installed inside a vehicle.

Other examples of timing include when the ignition power is turned off or when the power of a specific group of ECUs is turned off.

The measurement result reception unit 204 receives the measurement result, which is the responses from the prover device 100 to the measurement instruction transmitted by the measurement instruction transmission unit 203. For example, when the prover device 100 calculates the hash value as shown in FIG. 4B, these hash values h1, h2, and h3 are the measurement results.

A specific example of the measurement result received by the measurement result reception unit 204 will be explained using FIG. 9. In the example in FIG. 9, the measurement result received by the measurement result reception unit 204 includes an identifier of the measurement result (Result ID(1)), an identifier of the corresponding measurement instruction (Request ID(1)), the time when the prover device 100 calculated or transmitted the measurement result (Timestamp), and the first hash value, which is the measurement result.

The measurement unit 205 calculates the second hash value, which is the hash value of the master software stored in the storage unit 201. The hash value is calculated based on the nonce and measurement region information included in the measurement instruction generated by the measurement instruction generation unit 202. The calculation method is the same as shown in FIG. 4B.

The verification unit 206 verifies whether the first hash value, which is the measurement result received by the measurement result reception unit 204, matches the second hash value calculated by the measurement unit 205. When the values match, it can be confirmed that the software being executed on the prover device 100 has not been tampered. When the values do not match, it can be confirmed that the software executed by the prover device 100 may have been tampered. The verification unit 206 outputs the verification result to the evidence collection instruction generation unit 207.

The evidence collection instruction generation unit 207 generates an evidence request instruction to request the necessary evidence data based on the verification result derived from the measurement result. For example, when there is a suspicion that the software has been tampered with, all or part of the software running on the prover device 100 is requested as evidence data in order to prove tampering or to take measures against tampering.

A specific example of the evidence collection instructions generated by the evidence collection instruction generation unit 207 will be explained with reference to FIG. 10. In the example in FIG. 10, the evidence collection instruction includes an identifier of an evidence collection instruction (Request ID(2)), the time when the evidence collection instruction generation unit 207 generated the evidence collection instruction or when the evidence collection instruction transmission unit 208 transmitted the evidence collection instruction (Timestamp), the identifier of the measurement result that caused the evidence collection instruction to be generated (Result ID(1)), the name of the software that is the requested evidence data (Name), the start address of the software in a memory (Address), and the size of the software (Size).

FIG. 10 shows a case where a portion of software is requested as evidence data, but even if the entire software is requested, the starting location in a memory of the entire software and the size of the entire software need only be specified.

The evidence collection instruction transmission unit 208 transmits the evidence collection instructions generated by the evidence collection instruction generation unit 207 to the prover device 100.

The evidence data reception unit 209 receives evidence data from the anonymization processing device 10. In the case of the present embodiment, the evidence data received is the evidence data that has been anonymized by the anonymization processing device 10.

A specific example of the evidence data received by the evidence data reception unit 209 will be described with reference to FIG. 11. In the example of FIG. 11, the evidence data includes an identifier of the evidence data (Result ID(2)), the time at which the evidence data reception unit 209 received the evidence data (Timestamp), an identifier of the corresponding evidence collection instruction (Request ID(2)), and the raw data of the software, which is the evidence data (RAW data). The raw data of the software has been anonymized by the anonymization processing device 10 to remove personal information.

The analysis unit 210 analyzes the evidence data received by the evidence data reception unit 209. For example, the analysis unit 210 identifies an attack that tampered with the software and executes countermeasures against the attack. In this case, since the software used for the analysis has had personal information anonymized by the anonymization processing, it is possible to prevent the personal information from leaking through the verifier device 200.

(4) Operation of the Anonymization Processing Device 10

Figure 12:
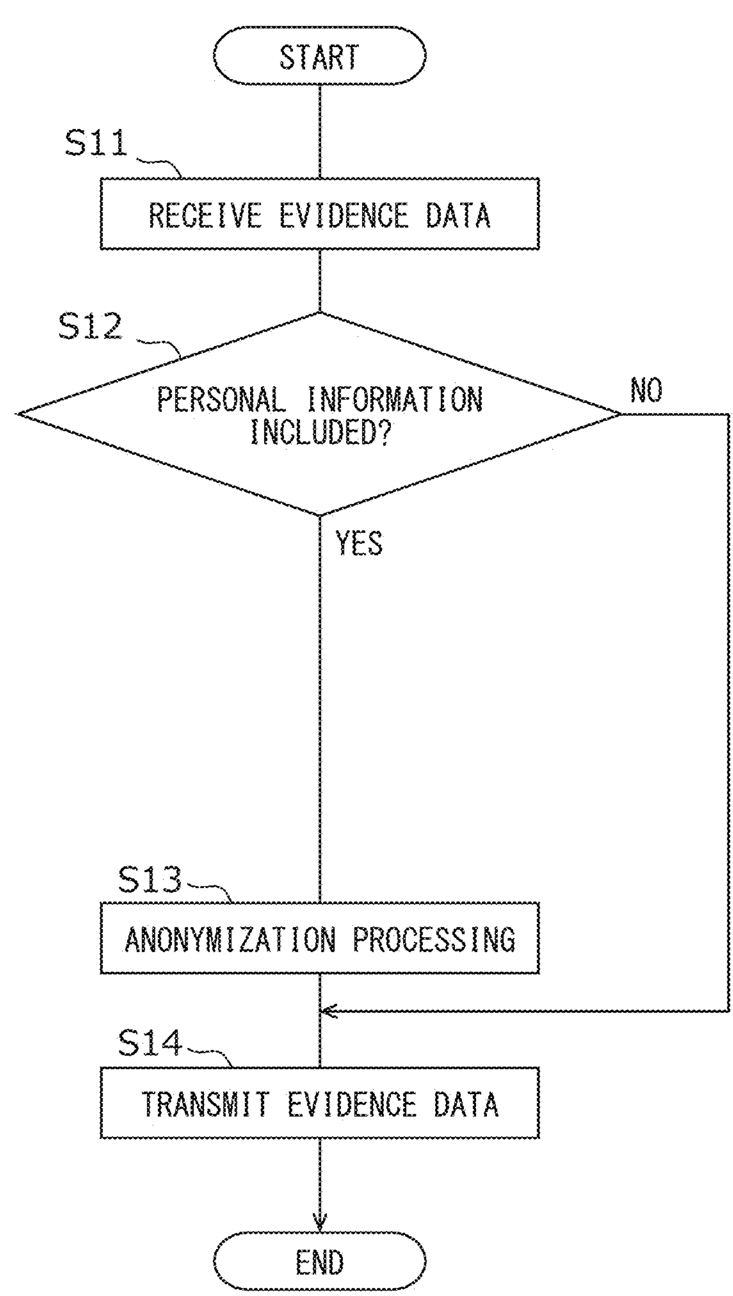
FIG. 12 is a flowchart illustrating the operation of the anonymization processing device according to the first embodiment.

The operation of the anonymization processing device 10 will be described with reference to FIG. 12. FIG. 12 shows not only the anonymization processing method executed by the anonymization processing device 10 but also the processing procedure of an anonymization processing program executable by the anonymization processing device 10. The processing described above is not limited to the order shown in FIG. 12. That is, the order may be interchanged as long as there are no restrictions, such as a relationship in which one process uses the results of its prior process. The same applies to the flowcharts of a second embodiment and a third embodiment.

The anonymization processing device 10 receives the evidence data "output" from the prover device 10 (S11).

The personal information detection unit 12 detects whether the evidence data received in S11 includes "personal information" (S12).

When the personal information is included (S12: Y), the anonymization processing unit 13 performs "anonymization processing" on the personal information included in the evidence data (S13). When the personal information is not included (S12: N), the process proceeds to S14 without performing the anonymization processing.

The evidence data transmission unit 14 transmits the evidence data anonymized in S13 or the evidence data not anonymized in S13 to the verifier device 200 (S14).

(5) Short Overview

As described above, according to the anonymization processing device 10 of the present embodiment, since the anonymization processing is performed on the personal information included in the evidence data, it is possible to prevent the personal information from being recognized by the verifier device, which is the destination of the evidence data. As a result, it is possible to prevent personal information from leaking through the verifier device.

Furthermore, according to the present embodiment, since personal information is overwritten with information indicating the type of personal information, it is possible to know what type of personal information was included on a side of the verifier device, providing helpful information for analysis at the verifier device.

Moreover, according to the present embodiment, since information indicating the type of personal information, the size of the personal information, and the address of the personal information are transmitted in addition to the evidence data, even if the personal information is deleted or encrypted, it is possible to know what kind of personal information was included in which part of the evidence data, providing helpful information for analysis at the verifier device.

3. Second Embodiment

Figure 13:
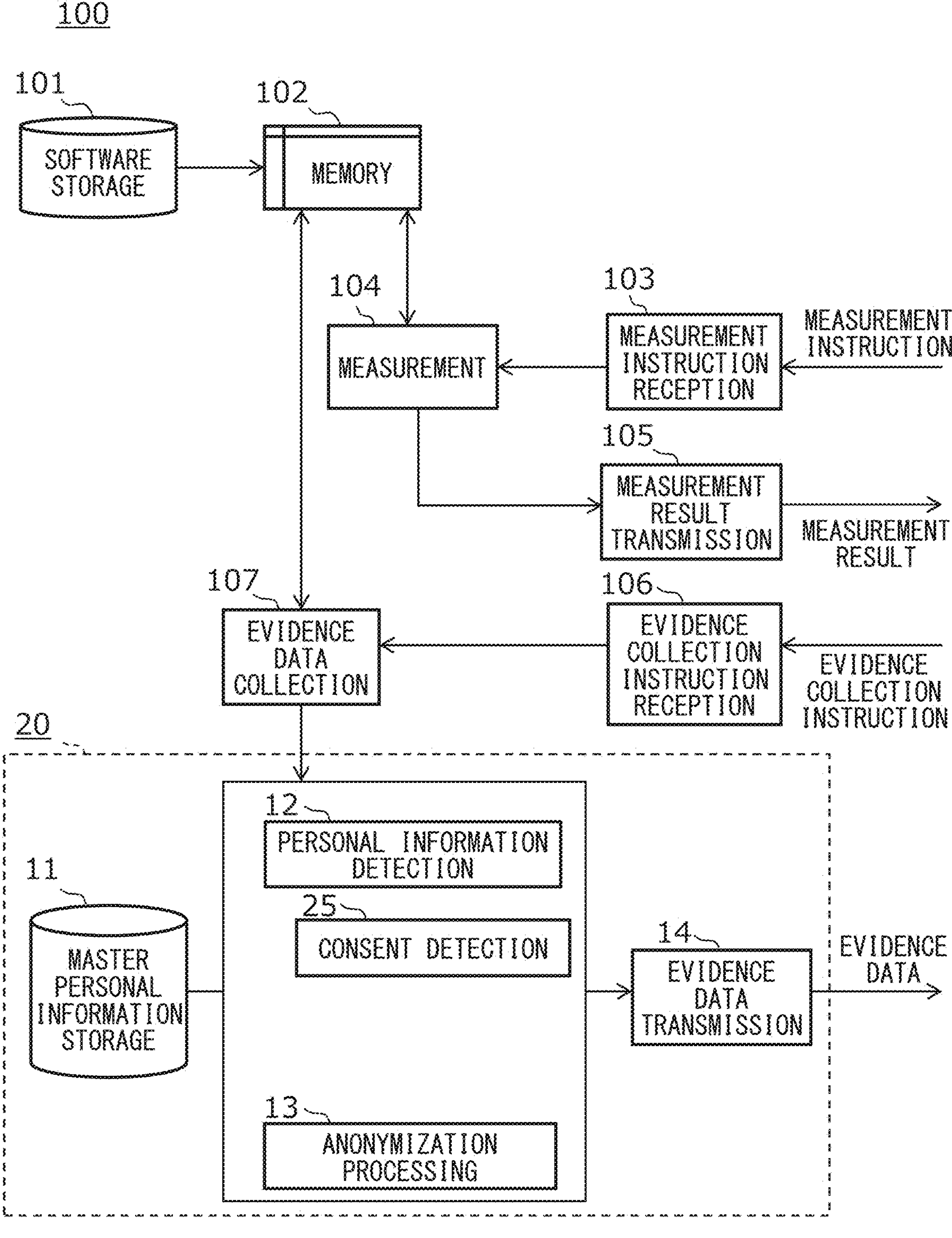
FIG. 13 is a block diagram illustrating the configuration example of the prover device and the anonymization processing device according to a second embodiment.
Figure 14:
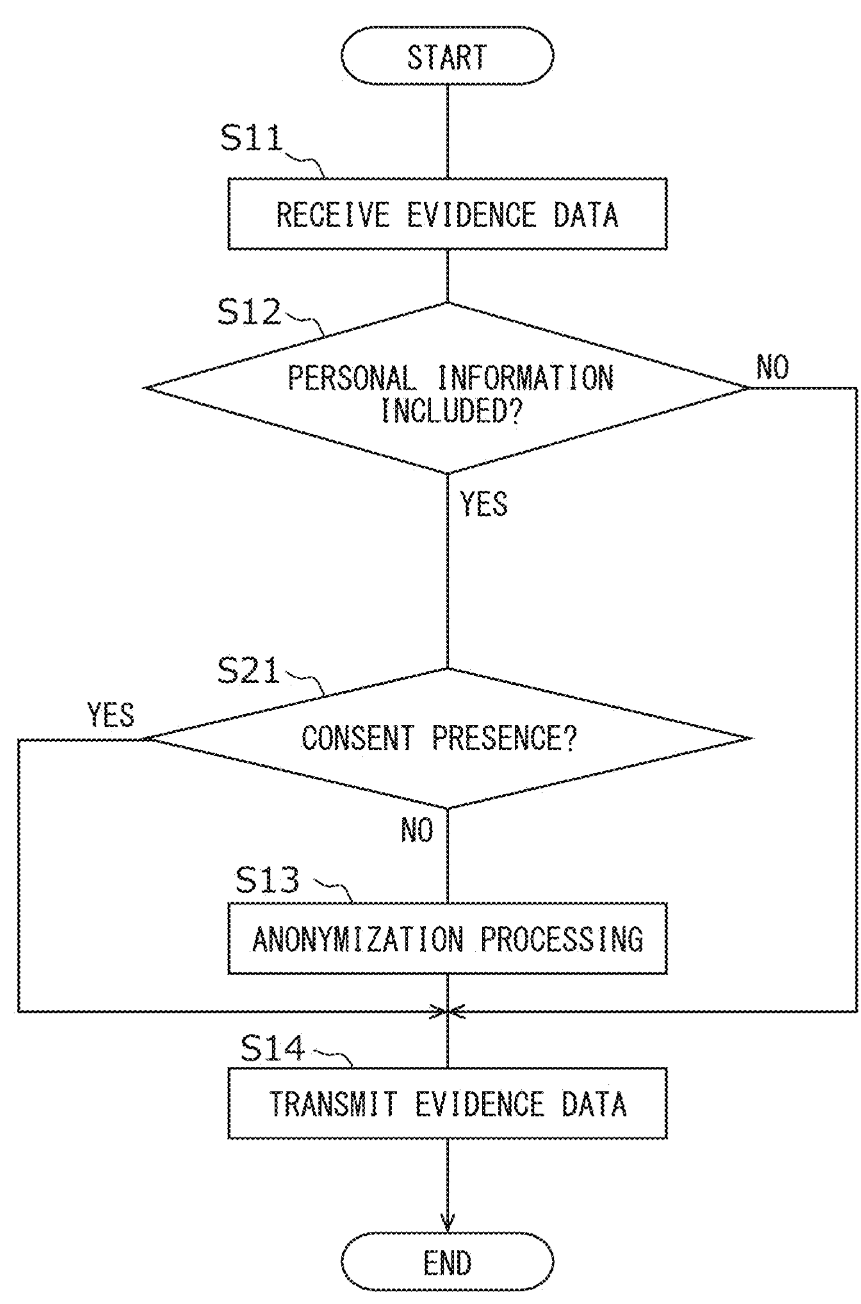
FIG. 14 is a flowchart illustrating the operation of the anonymization processing device according to the second embodiment.

The anonymization processing device 20 of the second embodiment is a device that determines whether to perform anonymization processing on personal information based on the presence or absence of consent. The structure of the anonymization processing device 20 of the present embodiment will be described with reference to FIG. 13, and the operation of the anonymization processing device 20 of the present embodiment will be described with reference to FIG. 14. In FIG. 13 and FIG. 14, the same components and operations as in the first embodiment are given the same numbers, and the description of the first embodiment is cited. Hereinafter, the different configurations and operations from the first embodiment will be described.

(1) Configuration of the Anonymization Processing Device 20

In FIG. 13, the consent detection unit 25 detects the presence or absence of consent to transmit the personal information contained in the evidence data to the verifier device 200.

For example, the consent detection unit 25 checks for the presence or absence of consent from the user of the prover device 100, that is, the owner or occupant of the vehicle in which the prover device 100 is installed. Specifically, on the screen of a navigation device (not shown), it displays a message such as, "Do you agree to send personal information included in the software installed in the electronic control device that performs obstacle detection of the vehicle to the manufacturer's verifier for the purpose of examining the presence of cyberattacks and countermeasures?" and confirms the user's consent.

Alternatively, on the side of the verifier device 200, for example, if it is understood from the survey results at the time of vehicle purchase that the user of the prover device 100 has given prior consent to the provision of personal information, the consent information indicating the user's consent may be included in the evidence collection instruction transmitted from the verifier device 200. The consent detection unit 25 of the prover device 100 that receives the consent information detects the presence or absence of the user's consent based on the consent information.

When the consent detection unit 25 detects that there is user consent, the consent detection unit 25 instructs the evidence data transmission unit 14 to transmit the evidence data that has not been anonymized by the anonymization processing unit 13, and the evidence data transmission unit 14 transmits the evidence data that has not been anonymized.

On the other hand, when the consent detection unit 25 detects that there is "no consent" from the user, the consent detection unit 25 instructs the evidence data transmission unit 14 to transmit evidence data that has been anonymized by the anonymization processing unit 13, and the evidence data transmission unit 14 transmits the anonymized evidence data.

Here, "no consent" includes not only cases where there is no consent but also cases where it is unclear whether there is consent.

(2) Operation of the Anonymization Processing Device 20

In FIG. 14, when the personal information is included (S12: Y), the consent detection unit 25 detects the presence or absence of consent to transmit the personal information included in the evidence data to the verifier device 200 (S21). When it is detected that there is consent (S21: Y), the process proceeds to S14. When it is detected that there is no consent (S21: N), the process proceeds to S13.

(3) Short Overview

As described above, according to the anonymization processing device 20 of the present embodiment, it is possible to determine whether or not to perform anonymization processing based on the presence or absence of consent. By not performing the anonymization processing when there is consent, the verifier device 200 can perform analysis considering specific personal information.

4. Third Embodiment

Figure 15:
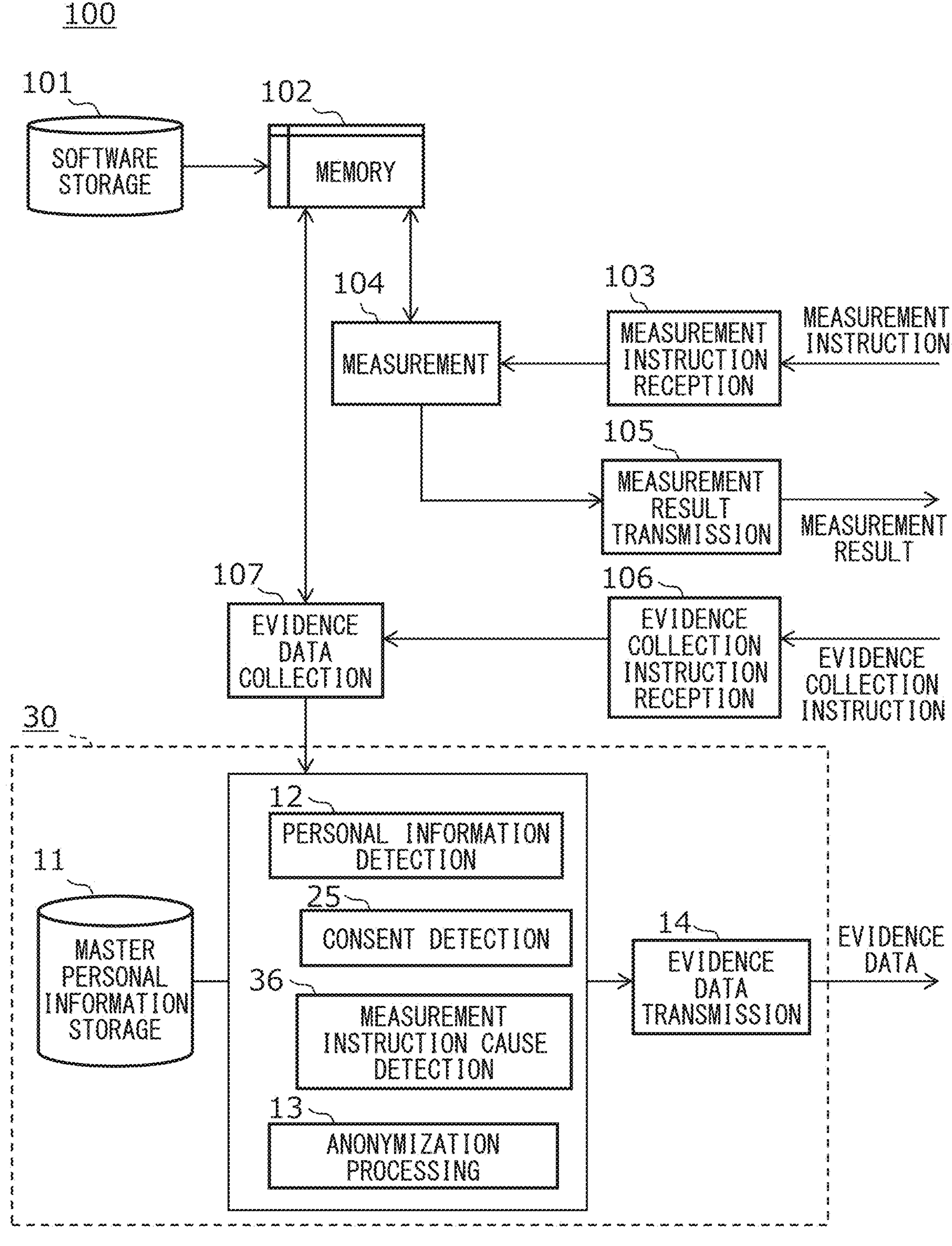
FIG. 15 is a block diagram illustrating the configuration example of the prover device and the anonymization processing device according to a third embodiment.
Figure 16:
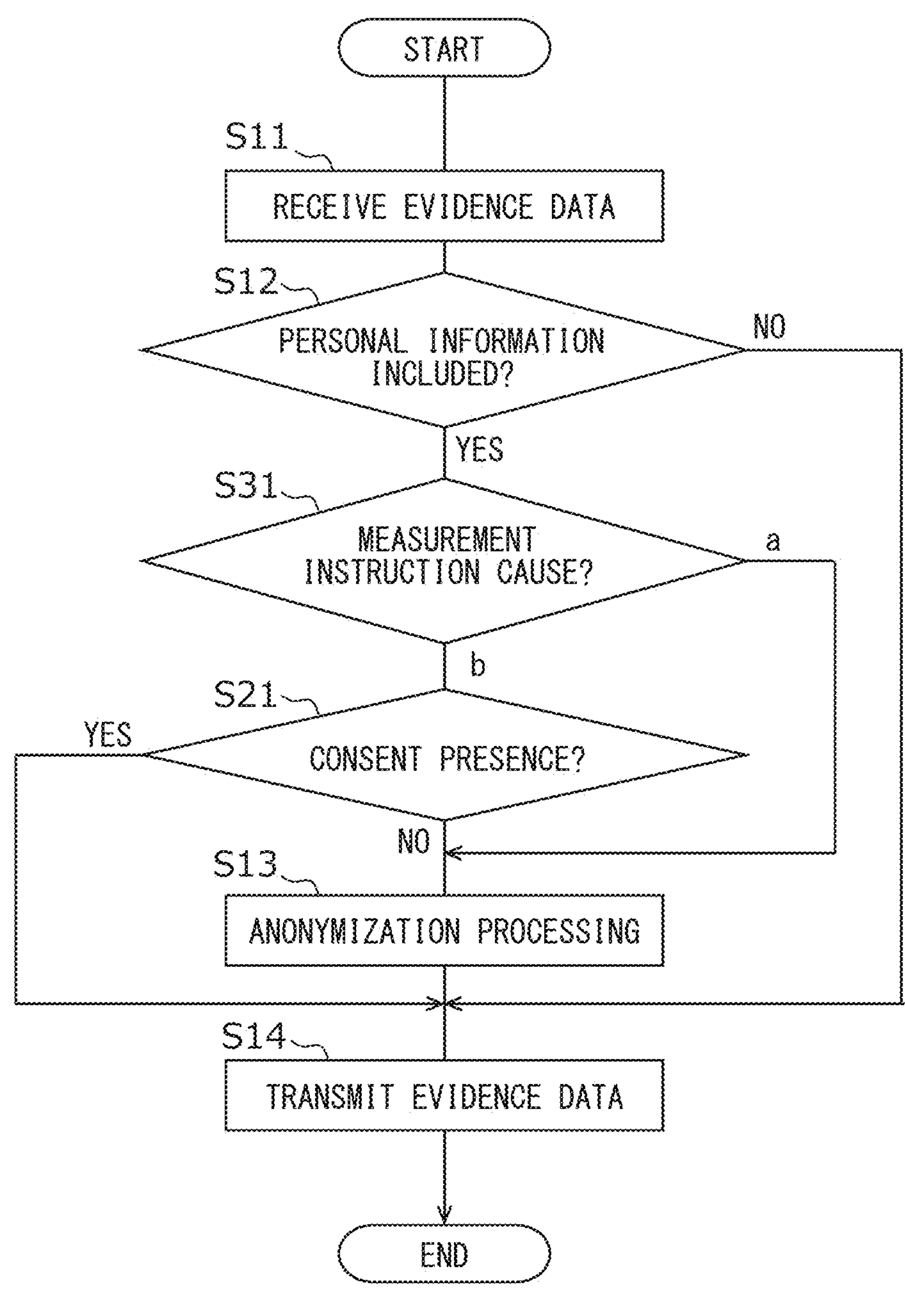
FIG. 16 is a flowchart illustrating the operation of the anonymization processing device according to the third embodiment.

The anonymization processing device 30 of the third embodiment is a device that executes anonymization processing for personal information in consideration of the cause of the measurement instruction. Hereinafter, the configuration of the anonymization processing device 30 of the present embodiment will be described with reference to FIG. 15, and the operation of the anonymization processing device 30 of the present embodiment will be described with reference to FIG. 16. In FIG. 15 and FIG. 16, the same numerals are assigned to the same configurations and operations as those in the first and second embodiments, and the descriptions of the first and second embodiments are cited. Hereinafter, configurations and operations different from those in the first and second embodiments will be described.

(1) Configuration of the Anonymization Processing Device 30

In FIG. 15, the measurement instruction cause detection unit 36 detects the cause of the measurement instruction transmitted by the verifier device 200. Specifically, the measurement instruction cause detection unit 36 detects the trigger for the generation and transmission of the measurement instruction by the verifier device 200.

The measurement instruction cause detection unit 36, upon detecting that the verifier device 200 has requested the evidence data due to a measurement instruction periodically transmitted from the verifier device 200, instructs the evidence data transmission unit 14 to transmit the evidence data anonymized by the anonymization processing unit 13. The evidence data transmission unit 14 transmits the anonymized evidence data. The information indicating the cause of the measurement instruction may be included in the measurement instruction by the measurement instruction generation unit 202 of the verifier device 200. Alternatively, it may be included in the evidence collection instruction by the evidence collection instruction generation unit 207 of the verifier device 200.

On the other hand, when the measurement instruction cause detection unit 36 detects that the verifier device 200 has requested the evidence data due to a measurement instruction transmitted from the verifier device 200 during an abnormal occurrence, the measurement instruction cause detection unit 36 instructs the evidence data transmission unit 14 based on the detection result of the consent presence or absence by the consent detection unit 25. Examples of abnormal occurrences have already been described.

(2) Operation of the Anonymization Processing Device 30

In FIG. 16, when the personal information is included (S12: Y), the measurement instruction cause detection unit 36 detects the cause of the measurement instruction (S31). When the evidence data is requested due to the measurement instruction periodically transmitted (S31: a), the process proceeds to S13. When the evidence data is requested due to the measurement instruction transmitted during an abnormal occurrence (S31: b), the process proceeds to S21.

(3) Short Overview

As described above, according to the anonymization processing device 30 of the present embodiment, the anonymization processing can be executed considering the cause of the measurement instruction. When the measurement instruction is due to periodic transmission, it may be a malfunction, and the verifier device 200 does not require personal information. Therefore, by performing anonymization processing, the risk of personal information leakage can be reduced.

On the other hand, when the measurement instruction is due to transmission during an abnormal occurrence, it may be due to a cyberattack, and the verifier device 200 may require personal information. Therefore, if there is user consent, anonymization processing is not performed, allowing the verifier device 200 to conduct an analysis considering specific personal information.

5. Other Embodiments

Among the disclosure disclosed in the first to third embodiments, the disclosures belonging to a category of programs are shown below.

(Anonymizing Process Program)

An anonymization processing method program executable by an anonymization processing device used in a case where in a remote attestation system including a prover device and a verifier device, the prover device transmits a measurement result in response to a measurement instruction from the verifier device, and the verifier device transmits an evidence collection instruction to the prover device requesting evidence data based on the measurement result, and the prover device transmits the evidence data to the verifier device is provided.

The anonymization processing program causes the anonymization processing device to:

detect whether the evidence data output from the prover device includes personal information;

perform anonymization processing on the personal information when the personal information is included; and transmit the anonymized evidence data to the verifier device.

6. Overview

As described above, the features of the anonymization processing device, the anonymization processing method, the anonymization processing program, and the remote attestation system in each embodiment of the present disclosure have been explained.

Since terms used in the embodiments are examples, the terms may be replaced with synonymous terms or terms including synonymous functions.

The block diagrams used for the description of the embodiments are obtained by classifying and organizing the configuration of each device for each function. The blocks representing the respective functions may be implemented by any combination of hardware or software. Since the blocks represent the functions, such a block diagram may also be understood as disclosures of a method and a program for implementing the method.

An order of functional blocks that can be understood as processes, flows, and methods described in the embodiments may be changed as long as there are no restrictions such as a relation in which results of preceding processes are used in one other process.

The terms such as first, second, to N-th (where N is an integer) used in each embodiment and in the claims are used to distinguish two or more configurations and methods of the same kind and are not intended to limit the order or superiority.

Further, examples of the device described in the present disclosure include the following.

Examples of a form of a component include a semiconductor element, an electronic circuit, a module, and a microcomputer.

Examples of a form of a semi-finished product include an electric control unit (ECU) and a system board.

Examples of a form of a finished product include a cellular phone, a smartphone, a tablet computer, a personal computer (PC), a workstation, and a server.

In addition, the device may include a device having a communication function or the like, and examples the device having a communication function may include a video camera, a still camera, and a car navigation system.

Necessary functions such as an antenna or a communication interface may be added to each device.

The device can be implemented not only by dedicated hardware having the configurations and functions described in the embodiments, but also by a combination of a program, which is recorded on a storage medium such as a memory or a hard disk and is used for implementing the above configuration and features, and general-purpose hardware that has a dedicated or general-purpose CPU that can execute the program, a memory, and the like.

A program stored in a non-transitory tangible storage medium (for example, an external storage device (a hard disk, a USB memory, and a CD/BD) of dedicated or general-purpose hardware, or an internal storage device (a RAM, a ROM, and the like)) may also be provided to dedicated or general-purpose hardware via the storage medium or from a server via a communication line without using the storage medium. Thereby, the latest functions can be provided at all times through program upgrade.

Although the present disclosure mainly describes a case of an in-vehicle electronic control unit installed in a vehicle as an anonymization processing device, it may be applied to all moving mobile vehicles, such as motorcycles, ships, trains, and aircraft. Further, the present disclosure is applicable not only to mobile objects but also to general products including microcomputers.

What is claimed is:

1. A remote attestation system comprising:

a prover device;

a verifier device; and an anonymization processing device, wherein:

the prover device is a device that places and executes software in a memory, including:

a measurement instruction reception unit that receives a measurement instruction from the verifier device;

a measurement unit that reads the software placed in the memory and calculates a measurement value based on the measurement instruction;

a measurement result transmission unit that transmits the measurement value as a measurement result to the verifier device;

an evidence collection instruction reception unit that receives an evidence collection instruction generated by the verifier device based on the measurement result; and an evidence data collection unit that collects evidence data based on the evidence collection instruction and outputs the evidence data to the anonymization processing device, the verifier device is a device that verifies integrity of the software executed by the prover device, including:

a measurement instruction generation unit that generates the measurement instruction;

a measurement instruction transmission unit that transmits the measurement instruction to the prover device;

a measurement result reception unit that receives the measurement result from the prover device;

an evidence collection instruction generation unit that generates the evidence collection instruction to request the evidence data based on the measurement result;

an evidence collection instruction transmission unit that transmits the evidence collection instruction to the prover device; and an evidence data reception unit that receives the evidence data from the anonymization processing device, the anonymization processing device includes:

a personal information detection unit that detects whether the evidence data output from the prover device contains personal information;

an anonymization processing unit that performs anonymization processing on the personal information when the personal information is included; and an evidence data transmission unit that transmits the anonymized evidence data to the verifier device.

2. The remote attestation system according to claim 1, wherein the measurement value includes a hash value.

* * * * *